(12) United States Patent
Danducci, II et al.

(10) Patent No.: US 11,477,603 B2
(45) Date of Patent: Oct. 18, 2022

(54) RECOMMENDING TARGETED LOCATIONS AND OPTIMAL EXPERIENCE TIME

(71) Applicant: International Business Machines Corporation, Armonk, NY (US)

(72) Inventors: Angelo Danducci, II, Austin, TX (US); Brittany L Barnes, Pflugerville, TX (US); Anindita Das, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/190,485

(22) Filed: Mar. 3, 2021

(65) Prior Publication Data

US 2022/0286804 A1 Sep. 8, 2022

(51) Int. Cl.
*H04W 4/021* (2018.01)
*G01S 19/42* (2010.01)
*H04L 67/306* (2022.01)

(52) U.S. Cl.
CPC ............. *H04W 4/021* (2013.01); *G01S 19/42* (2013.01); *H04L 67/306* (2013.01)

(58) Field of Classification Search
None
See application file for complete search history.

(56) References Cited

U.S. PATENT DOCUMENTS

| 8,775,420 | B2 | 7/2014 | Scheibe |
| 9,568,331 | B1* | 2/2017 | Narang ............. G01C 21/3617 |
| 9,716,827 | B2 | 7/2017 | Bostick |
| 9,817,907 | B1* | 11/2017 | Sharifi ............. G06F 16/24578 |
| 2011/0238476 | A1* | 9/2011 | Carr ...................... H04W 4/21 705/14.25 |

(Continued)

FOREIGN PATENT DOCUMENTS

| CN | 103428342 A | 12/2013 |
| CN | 109191333 A | 1/2019 |

(Continued)

OTHER PUBLICATIONS

Tsai et al. Photo sundial: Estimating the time of capture in consumer photos, Elsevier, Neurocomputing (Year: 2016).*

(Continued)

*Primary Examiner* — Caroline H Jahnige
*Assistant Examiner* — Abderrahmen Chouat
(74) *Attorney, Agent, or Firm* — Stephanie L. Carusillo

(57) ABSTRACT

In an approach for recommending locations to visit at an optimal experience time and optimal spot to take a photo and/or a video of a location, a processor determines a geographic location where a user is located. A processor identifies a plurality of targeted locations within a predefined distance of the geographic location of the user. A processor determines an optimal time to visit the plurality of targeted locations. A processor determines an optimal weather condition to experience the plurality of targeted locations. A processor determines an optimal spot to capture at least one of a photo and a video of the plurality of targeted locations. A processor assigns a ranking to the plurality of targeted locations based on a set of factors in a user profile of the user. A processor outputs a recommendation with at least one of the plurality of targeted locations as an alert notification.

19 Claims, 6 Drawing Sheets

(56) References Cited

U.S. PATENT DOCUMENTS

| | | | | |
|---|---|---|---|---|
| 2013/0036139 | A1* | 2/2013 | Kung | G06Q 10/025 707/780 |
| 2013/0239049 | A1* | 9/2013 | Perrodin | H04N 1/00453 715/781 |
| 2014/0247966 | A1* | 9/2014 | Dimitrov | G06V 20/30 382/103 |
| 2016/0301860 | A1* | 10/2016 | Bostick | G06F 16/5838 |
| 2017/0034459 | A1* | 2/2017 | Matsimanis | H04N 5/2171 |
| 2017/0293673 | A1* | 10/2017 | Purumala | G06F 3/04855 |
| 2017/0358022 | A1* | 12/2017 | Deak | H04W 4/027 |
| 2018/0260916 | A1* | 9/2018 | Zaltzman | G06Q 30/0643 |
| 2019/0147620 | A1* | 5/2019 | Pinel | H04N 5/23222 382/159 |
| 2021/0224310 | A1* | 7/2021 | Zhelezniakov | G06V 20/30 |

FOREIGN PATENT DOCUMENTS

| | | |
|---|---|---|
| CN | 109299389 A | 2/2019 |
| CN | 109508428 A | 3/2019 |
| CN | 107133277 B | 9/2019 |
| CN | 106202355 B | 3/2020 |
| TW | 201701230 A | 1/2017 |

OTHER PUBLICATIONS

Anonymous et al., "U.S. Travel and Tourism Overview (2019)", U.S. Travel Association, Mar. 2020, 3 Pages.

Bradley, Claire, "10 States Cashing in on Tourism", Investopedia, Feb. 4, 2020, 3 Pages.

Chen et al., "Popularity analysis of tourist attraction based on geotagged social media big data", Science of Surveying and Mapping, vol. 41, No. 12, China, 2016, (Abstract Only).

DecisionData Team, "The Best Time to Visit Anywhere in the World", DecisionData.org, Apr. 23, 2020, 3 Pages.

Gade, Kenneth, "The Seven Ways to Find Heading", The Journal of Navigation, vol. 69, Issue 05, 955-970, © The Royal Institute of Navigation, Sep. 2016, 16 Pages.

McNamara, Tom, "AccuWeather app adds activity suggestions based on the weather and your location", CNET News, Aug. 30, 2018, 2 Pages.

Sandnes, Frode Elka, "Determining the Geographical Location of Image Scenes based on Object Shadow Lengths", Journal of Signal Processing Systems, vol. 65, Issue 1, 35-47, Sep. 2011, 26 Pages.

* cited by examiner

RECOMMENDING TARGETED LOCATIONS AND OPTIMAL EXPERIENCE TIME

BACKGROUND OF THE INVENTION

The present invention relates generally to the field of data processing, and more particularly to a system and method for recommending locations to visit at an optimal experience time and optimal spot to take a photo and/or a video of a location.

SUMMARY

Aspects of an embodiment of the present invention disclose a method, computer program product, and computer system for recommending at least one of the plurality of targeted locations along with an optimal time to visit each of the plurality of targeted locations, an optimal weather condition to experience each of the plurality of targeted locations, and an optimal spot to capture at least one of a photo and a video of each of the plurality of targeted locations. A processor determines a geographic location where a user is located. A processor identifies a plurality of targeted locations within a pre-defined distance of the geographic location of the user. A processor determines an optimal time to visit each of the plurality of targeted locations. A processor determines an optimal weather condition to experience each of the plurality of targeted locations. A processor determines an optimal spot to capture at least one of a photo and a video of each of the plurality of targeted locations. A processor assigns a ranking to each of the plurality of targeted locations based on a set of factors in a user profile of the user. A processor outputs a recommendation with at least one of the plurality of targeted locations as an alert notification.

In some aspects of an embodiment of the present invention, subsequent to outputting the recommendation with at least one of the plurality of targeted locations as the alert notification, a processor requests feedback from the user. A processor receives feedback from the user based on the recommendation with at least one of the plurality of targeted locations. A processor adjusts future recommendations based on the received feedback on the recommendation. A processor stores the received feedback.

In some aspects of an embodiment of the present invention, a processor scrapes population density data for the geographical location of the user from a network-based cell phone carrier or scrapes data from social media posts in which the plurality of targeted locations is the subject.

In some aspects of an embodiment of the present invention, a processor scrapes data from one or more social media posts with high engagement on a social media platform. A processor selects a second photo from the data scraped from the one or more social media posts. A processor determines whether the second photo has a date stamp and a time stamp. Responsive to determining the second photo does not have the date stamp and the time stamp, a processor determines a date and a time the second photo was taken.

In some aspects of an embodiment of the present invention, a processor uses a solar cycle involving a known path of travel of the sun or uses a lunar cycle.

In some aspects of an embodiment of the present invention, a processor determines whether a weather condition is ascertainable from the second photo. Responsive to determining the weather condition is not ascertainable from the second photo, a processor determines what the weather condition is at the targeted location.

In some aspects of an embodiment of the present invention, a processor determines whether the second photo has a set of Global Positioning System (GPS) coordinates associated with the second photo. Responsive to determining the second photo does not have the set of GPS coordinates associated, a processor assigns the set of GPS coordinates to the second photo and calculates a heading.

In some aspects of an embodiment of the present invention, a processor uses the set of GPS coordinates captured when the second photo was taken and stored as data in Exchangeable Image File format by at least one of a phone of the user and a camera of the user and uses geo-spatial information extracted from the second photo from the data scraped from the one or more social media posts.

In some aspects of an embodiment of the present invention, a processor uses a doppler effect when comparing data received from a Global Navigation Satellite System (GNSS) or a GPS with the movement of an object receiving data.

In some aspects of an embodiment of the present invention, the set of factors comprises a user interest, the pre-defined distance of the geographic location of the user, a route to travel to and from the plurality of targeted locations, popularity of the plurality of targeted locations, a limited crowd size, a time of day, a weather condition, an advertisement from a local business, an incentive offered by the local business, a targeted location that is compliant with the Americans with Disabilities Act, a tourism service, and a targeted location that provides facilities including a restroom, a vending machine, or a water fountain.

In some aspects of an embodiment of the present invention, a processor identifies that the user input at least one of the plurality of targeted locations into the user profile of the user. A processor monitors for data. A processor determines whether a pre-defined threshold is met. Responsive to determining the pre-defined threshold is met, a processor outputs a recommendation with the one or more targeted locations as an alert notification.

In some aspects of an embodiment of the present invention, the pre-defined threshold is at least one of a peak experience time when the current conditions of the one or more targeted locations match the historically highest rated conditions of the one or more targeted locations and a rare occurrence.

In some aspects of an embodiment of the present invention, the historically highest rated conditions are the optimal time to visit each of the plurality of targeted locations and the optimal weather condition to experience each of the plurality of targeted locations.

In some aspects of an embodiment of the present invention, the recommendation comprises the optimal time to visit each of the plurality of targeted locations, the optimal weather condition to experience each of the plurality of targeted locations, and the optimal spot to capture at least one of a photo and a video of each of the plurality of targeted locations.

DETAILED DESCRIPTION

Figure 1:
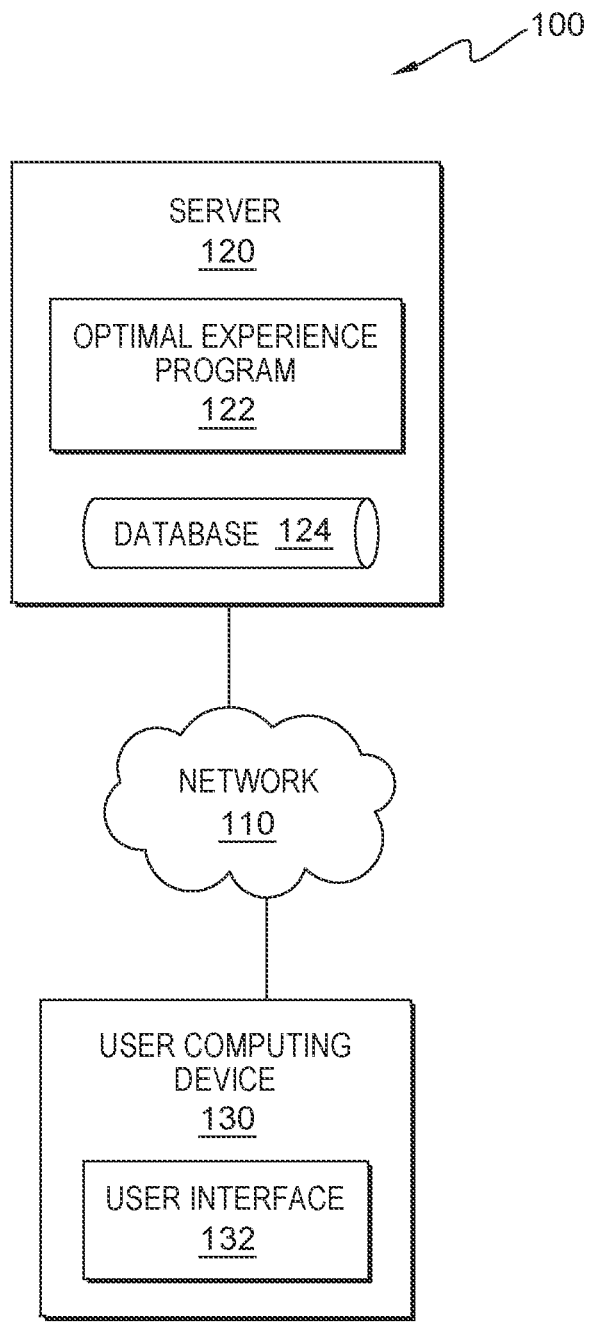
FIG. 1 is a functional block diagram illustrating a distributed data processing environment, in accordance with an embodiment of the present invention.

Embodiments of the present invention recognize that mobile travel applications ("apps") can be highly valuable for helping travelers save both time and money, while also making the travel experience much less stressful. Current mobile travel apps, however, fall short of providing travelers with the most optimal experience because current mobile travel apps fail to provide travelers with information on local experiences and hidden gems that travelers don't often get to see. Instead, current mobile travel apps focus on the well-known and highly visited attractions. Additionally, current mobile travel apps offer predictive weather recommendations based on seasonal averages for a given location but fail to offer current real-time weather recommendations.

Embodiments of the present invention provide a system and method to identify a plurality of targeted locations for the user to visit. Embodiments of the present invention identify the plurality of targeted locations by scraping population density data for the geographical location of the user from a network-based cell phone carrier and/or by scraping data from social media posts in which the plurality of targeted locations is the subject.

Embodiments of the present invention provide a system and method to determine when is the optimal time to visit each of the plurality of targeted locations, the optimal weather condition to experience each of the plurality of targeted locations, and the optimal spot to capture at least one of a photo and a video of each of the plurality of targeted locations.

Embodiments of the present invention create a dataset that includes, but is not limited to, the calculated distance between the current location of the user and the targeted location, the anticipated popularity of the targeted location at a specific date and/or time of day, the expected weather pattern at a specific date and/or time of day, and the approximate geographical location from where the traveler can capture at least one of a photo and a video of the targeted location.

For a first data point of the dataset, embodiments of the present invention calculate the distance between the current location of the user and the targeted location by mapping one or more routes the user can travel by one or more modes of transportation.

For a second data point of the dataset, embodiments of the present invention determine the anticipated popularity of the targeted location at a specific date and/or time of day by scraping at least one photo from at least one social media post. If provided, embodiments of the present invention use the date stamp and the time stamp on the photo to determine on what day and at what time the photo was taken. If the date stamp is present on the photo, but the time stamp is missing, embodiments of the present invention use the solar and/or the lunar cycle to determine what time the photo was taken.

For a third data point of the dataset, embodiments of the present invention determine when the weather patterns (e.g., sunny, cloudy, windy, snowy, and rainy) will be optimal to view the targeted location by using the current and the forecasted weather data.

For a fourth data point of the dataset, embodiments of the present invention determine the approximate geographical location from where the traveler can capture at least one of a photo and a video of the targeted location. Embodiments of the present invention use the set of GPS coordinates that were captured by a user's phone and/or camera when a photo was taken and stored as data in Exchangeable Image File (EXIF) format to determine the approximate geographical information. Embodiments of the present invention also use geo-spatial information extracted from a photo scraped from a social media post to determine the approximate geographical location. The photo scraped from the social media post is considered to have been captured from the optimal location with the optimal light exposure and at the optimal angle and distance. Embodiments of the present invention use geo-spatial information extracted from the scraped photo that is based on celestial information, including, but not limited to, the elevation of the sun, and time information.

In short, the elevation of the sun is estimated indirectly by measuring the relative length of objects in the scraped photo and their shadows. The estimated sun elevation and the creation time of the scraped photo is then input into a celestial model to estimate the approximate geographical location where the photo was captured.

In long, given an object with a height H and a shadow with length L, the elevation e of the sun is defined as:

$$e = \tan^{-1}\left(\frac{H}{L}\right).$$

The relationship between the elevation of the sun e and the geographical location of the observer is given by:

$$\sin e = \sin \delta \sin \varphi + \cos \delta \cos \varphi \cos \omega;$$

where $\varphi$ is the latitude of the observer, $\omega$ is the sun angle of the observer, and $\delta$ is the declination of the sun at the given date, which can be approximated by:

$$\delta = -0.4092797 \cos\left(\frac{2\pi}{365}(M+10)\right).$$

The declination of the sun is represented in radians and M denotes the day of the year. The constant 0.4092797 represents the maximum declination angle of the sun, or earth tilt, in radians) (23.45° that occurs during the two solstices. The longitude $\lambda$ of the observer is related to the solar time $t_{sun}$ as follows:

$$t_{sun} = t_{utc} - \frac{12}{\pi}\lambda;$$

and solar time $t_{sun}$ is related to the sun angle $\omega$ as follows:

$$\omega = \frac{180}{12}(t_{sun} - 12).$$

Given an elevation measurement $e_1$ at UTC time $t_1$, one can find the approximate geographical location where the photo was captured with the given sun elevation for the given time.

For the fourth data point of the dataset, embodiments of the present invention also determine the heading of the approximate geographical location from where the optimal photo should be captured using the Doppler effect when comparing data received from a GNSS and/or GPS with the movement of an object receiving the data.

Heading is one of three rotational degrees of freedom, which is natural to define for land, sea, and air navigation, due to the direction of gravity. Heading means the orientation about the vertical direction vector, where vertical is defined as the normal to the reference ellipsoid. Heading can be represented in several ways, e.g., as a scalar, such as in the Euler angles roll, pitch, and yaw. Heading can also be represented by a rotation matrix or quaternion containing the full orientation. The vector, a coordinate free/geometrical vector, used to find heading is denoted by $\vec{x}$. The vector must have a known or measurable direction relative to the Earth (E) and a known length, such that $x^E$ is known.

Vehicle (B) represents a moving object capable of receiving GNSS and/or GPS data. The vector relative to the vehicle is denoted by $x^B$. The relation between these vectors is $$x^E = R_{EB} x^B;$$

where $R_{EB}$ is the vehicle orientation.

To find the heading, the velocity vector $\vec{v}_{EB}$ can be used when the vehicle has a non-zero horizontal component, i.e., $$x_{horizontal} \neq \vec{0}.$$

Finding $\vec{v}_{EB}^B$ can be done using a Doppler sensor, such as an underwater acoustic Doppler velocity log, or a Doppler radar. One or more cameras can also be used, where the optical flow of Earth-fixed features is tracked. Sensors that measure velocity relative to water or air may also be used if the sea current or wind is known (or small relative to $\vec{v}_{EB}$). Finally, $v_{EB}^B$ can also be found from knowledge of the vehicle movement, e.g., a vehicle on rails or wheels may have a restricted movement such that $$v_{EB}^B \approx \begin{bmatrix} x \\ 0 \\ 0 \end{bmatrix};$$

where x is the forward speed (and hence the course equals the heading). For vehicles in air/water, an aerodynamic/hydrodynamic model may be used to calculate velocity relative to the surrounding air/water. For this method to work, $v_{EB}^B$ is needed and can be obtained from GNSS. If position measurements ($p_{EB}^E$) are available, $v_{EB}^B$ can in theory be found by direct differentiation.

Essentially, heading is calculated using the Doppler effect to compare data received from the GNSS and/or GPS to the movement of an object receiving the data. The Doppler effect is produced by a moving source of waves when there is an apparent upward shift in frequency for observers towards whom the source is approaching and an apparent downward shift in frequency for observers from whom the source is receding. Thus, the Doppler effect is the apparent difference between the frequency at which sound or light waves leave a source and that at which they reach an observer, caused by relative motion of the observer and the wave source.

For example, as one approaches a blowing horn, the perceived pitch is higher until the horn is reached and then becomes lower as the blowing horn is passed. In another example, the light from a star, observed from the Earth, shifts toward the red end of the spectrum (lower frequency or longer wavelength) if the Earth and the star are receding from each other and toward the violet end of the spectrum (higher frequency or shorter wavelength) if they are approaching each other.

In another example particular to this application, a traveler is located at (2, 2) on a cartesian graph that overlays a map. The traveler knows that the traveler's velocity is 1, however, the traveler does not know in which direction the traveler is traveling. The traveler moves to (2, 3) on the cartesian graph. After receiving a second set of GNSS and/or GPS data, the traveler can determine that the traveler has moved one unit in the positive y direction or north on a traditional map.

Embodiments of the present invention provide a system and method that ranks the plurality of targeted locations using a number of factors and then sends the ranked targeted locations and the corresponding datasets as an alert notification. Embodiments of the present invention store the ranked targeted locations and the corresponding datasets for future iterative feedback in a public, crowd-sourced, cloud-based database.

Implementation of embodiments of the invention may take a variety of forms, and exemplary implementation details are discussed subsequently with reference to the Figures.

FIG. 1 is a functional block diagram illustrating a distributed data processing environment, generally designated 100, for recommending targeted locations and optimal times to experience the targeted locations, in accordance with one embodiment of the present invention. In the depicted embodiment, distributed data processing environment 100 includes server 120 and user device computing device 130, interconnected over network 110. Distributed data processing environment 100 may include additional servers, computers, computing devices, IoT sensors, and other devices not shown. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run optimal experience program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 6.

Optimal experience program 122 operates to identify a plurality of targeted locations for a user to visit and to determine an optimal time to visit each of the plurality of targeted locations, an optimal weather condition to experience each of the plurality of targeted locations, and an optimal spot to capture at least one of a photo and a video of each of the plurality of targeted locations. In the depicted embodiment, optimal experience program 122 is a standalone program. In another embodiment, optimal experience program 122 may be integrated into another software product, such as a travel agent or travel management software. In an embodiment, a user opts-in to optimal experience program 122 and sets up a user profile with optimal experience program 122. The setup component of optimal experience program 122 is depicted and described in further detail with respect to FIG. 2. The two main components of optimal experience program 122, the pull and push components, are depicted and described in further detail with respect to FIGS. 3 and 4. The operational steps of dataset creation step 340 of the pull component of optimal experience program 122 and of dataset creation step 415 of the push component of optimal experience program 122 are depicted and described in further detail with respect to FIG. 5. In the depicted embodiment, optimal experience program 122 resides on server 120. In other embodiments, optimal experience program 122 may reside on user computing device 130 or on another computing device (not shown), provided that optimal experience program 122 has access to network 110.

Database 124 operates as a public, crowd-sourced, cloud-based repository for data received, used, and/or generated by optimal experience program 122. A database is an organized collection of data. Data includes, but is not limited to, a plurality of user profiles with information input by users during setup about the respective current location of the user and about the locations where the respective user intends to travel to or would like to travel to; user preferences, alert notification preferences, and travel preferences; and any other data received, used, and/or generated by optimal experience program 122.

Database 124 can be implemented with any type of device capable of storing data and configuration files that can be accessed and utilized by server 120, such as a hard disk drive, a database server, or a flash memory. In an embodiment, database 124 is accessed by optimal experience program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that optimal experience program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Optimal experience program 122 enables the authorized and secure processing of personal data.

Optimal experience program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Optimal experience program 122 provides information regarding personal and/or confidential company data and the nature (e.g., type, scope, purpose, duration, etc.) of the processing. Optimal experience program 122 provides the user with copies of stored personal and/or confidential company data. Optimal experience program 122 allows the correction or completion of incorrect or incomplete personal and/or confidential company data. Optimal experience program 122 allows for the immediate deletion of personal and/or confidential company data.

User computing device 130 operates to run user interface 132 and is associated with a user. In an embodiment, user computing device 130 may be an electronic device, such as a laptop computer, a tablet computer, a netbook computer, a personal computer, a desktop computer, a smart phone, or any programmable electronic device capable of running user interface 132 and communicating (i.e., sending data to and receiving data from) with optimal experience program 122 via network 110. In the depicted embodiment, user computing device 130 includes an instance of user interface 132. User computing device 130 may include components as described in further detail in FIG. 6.

User interface 132 operates as a local user interface between optimal experience program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from optimal experience program 122 to a user via network 110. User interface 132 can also display or present alert notifications including information (e.g., graphics, text, and/or sound) sent from optimal experience program 122 to a user via network 110. In an embodiment, user interface 132 is capable of sending and receiving data (i.e., to and from optimal experience program 122 via network 110, respectively).

Through user interface 132, a user can opt-in to optimal experience program 122; create a user profile; set user preferences, alert notification preferences, and travel preferences; input information about the current location of the user, information about where the user intends to travel to, and information about targeted locations the user would like to visit; request a search be conducted to determine what is the optimal targeted location to visit, when is the optimal time to visit the targeted location, and where is the optimal spot to capture at least one of a photo and a video of the targeted location; and receive automatic alert notifications about recommended targeted locations.

A user preference is a setting that can be customized for a particular user. A set of default user preferences is assigned to each user of optimal experience program 122. A user preference editor can be used by the user to update values to set the user preferences. User preferences that can be customized to include, but are not limited to, general user system settings, specific user profile settings for optimal experience program 122, alert notification settings, and machine-learned data collection/storage settings. Machine-learned data includes, but is not limited to, data regarding past results of iterations of optimal experience program 122 and a user's previous response to a notification sent by optimal experience program 122. Machine-learned data comes from optimal experience program 122 self-learning what are appropriate recommendations to make to the user and what will the user's response to the recommendations be through tracked user activity for the purpose of improving each iteration of optimal experience program 122 to better coincide with how the user would react to each individual alert notification.

Figure 2:
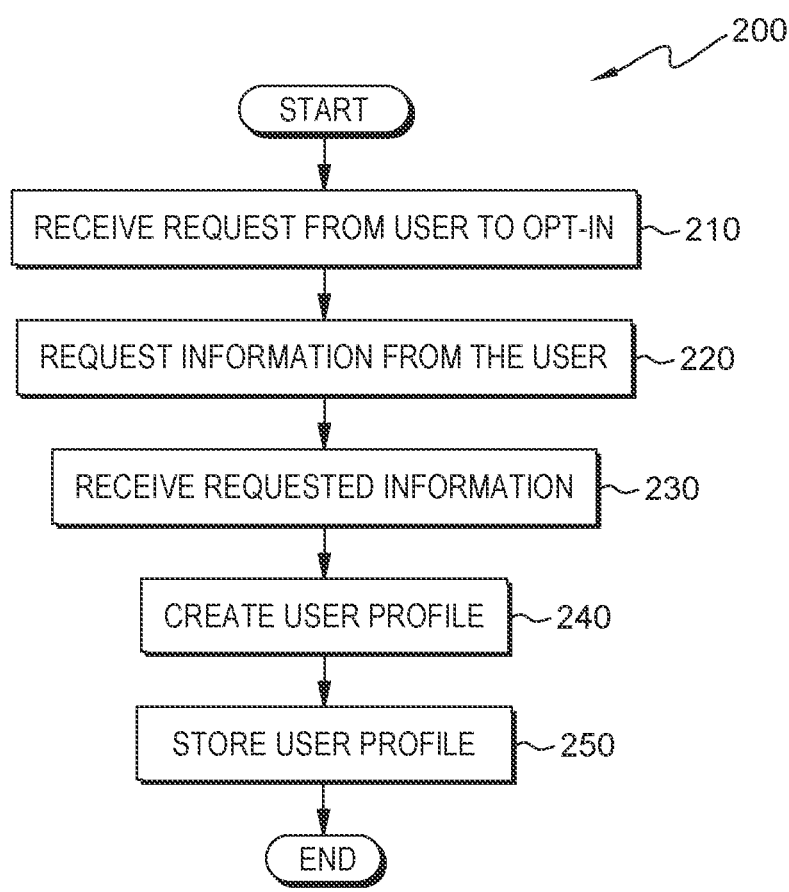
FIG. 2 is a flowchart depicting the operational steps for a setup component of an optimal experience program in a distributed data processing environment, such as the one depicted in FIG. 1, in accordance with an embodiment of the present invention.

FIG. 2 is a flowchart, generally designated 200, depicting the operational steps for a setup component of optimal experience program 122 in distributed data processing environment 100 of FIG. 1, in accordance with an embodiment of the present invention. In an embodiment, optimal experience program 122 completes a one-time setup with a user who is looking to visit a targeted location at the optimal time in the optimal weather conditions and to capture at least one of a photo and a video of the targeted location from the optimal spot. The one-time step allows for optimal experience program 122 to capture relevant information about the user to create a user profile. In an embodiment, optimal experience program 122 receives a request from the user to opt-in. In an embodiment, optimal experience program 122 requests information from the user. In an embodiment, optimal experience program 122 receives the requested information from the user. In an embodiment, optimal experience program 122 creates a user profile. In an embodiment, optimal experience program 122 stores the user's profile. It should be appreciated that the process depicted in FIG. 2 illustrates one possible iteration of optimal experience program 122, which may be repeated for each opt-in request received by optimal experience program 122.

In step 210, optimal experience program 122 receives a request from the user to opt-in. In an embodiment, optimal experience program 122 receives a request from the user to opt-in to optimal experience program 122. In an embodiment, optimal experience program 122 receives a request from the user to opt-in to optimal experience program 122 through user interface 132 of user computing device 130. By opting-in, the user agrees to share data with database 124. For example, traveler A sends a request to opt-in to optimal experience program 122 through user interface 132 of user computing device 130.

In step 220, optimal experience program 122 requests information from the user. In an embodiment, optimal experience program 122 requests information from the user through user interface 132 of user computing device 130. In an embodiment, responsive to optimal experience program 122 receiving the request from the user to opt-in, optimal experience program 122 requests information from the user.

Information requested from the user includes, but is not limited to, information about user preferences (e.g., general user system settings regarding alert notifications, such as for user computing device 130); frequency of alert notifications preferences (e.g., an alert notification is sent at a set interval or an alert notification is sent every time optimal experience program 122 determines it is the optimal time to visit a targeted location); location services preferences (e.g., requesting permission to enable location services on user's computing device to access user's location whether that be limited access to user's location data "while in use" (i.e., only when the user is using the app or approximate location) or full access to user's location data "when it is in the background" (i.e., even when the user is not using the app or precise location); information about points of interest (e.g., restaurants, bars, coffee houses, food trucks, small local neighborhood businesses, malls, clubs, theaters, concert halls, arenas, art galleries, museums, historic landmarks, internationally recognized landmarks, memorials, gardens, parks, zoos, rivers, oceans, other bodies of water, etc.); points of interest preferences (e.g., user indicated five points of interests and must see all five during the user's trip or the user indicated five points of interests but is willing to miss three of the points of interest in order to capture photos of events that only happen at certain times of the day at two of the points of interests); mode of transportation preferences (e.g., foot, bicycle, motorcycle, car, taxi, bus, train, ferry, airplane, etc.); number of travelers with the user; information about the relationship between travelers; and information about the user's budget.

In step 230, optimal experience program 122 receives the requested information from the user. In an embodiment, optimal experience program 122 receives the requested information from the user through user interface 132 of user computing device 130. In an embodiment, responsive to optimal experience program 122 requesting information from the user, optimal experience program 122 receives the information from the user.

In step 240, optimal experience program 122 creates a user profile. In an embodiment, optimal experience program 122 creates a user profile for the user. In an embodiment, optimal experience program 122 creates a user profile with information input by users during setup regarding the user, as well as user preferences and alert notification preferences. In an embodiment, responsive to optimal experience program 122 receiving the information from the user, optimal experience program 122 creates a user profile for the user.

In step 250, optimal experience program 122 stores the user profile. In an embodiment, optimal experience program 122 stores the user profile in a database, e.g., a public, crowdsourced, cloud-based database, e.g., database 124. In an embodiment, responsive to optimal experience program 122 creating the user profile for the user, optimal experience program 122 stores the user profile in a database.

Figure 3:
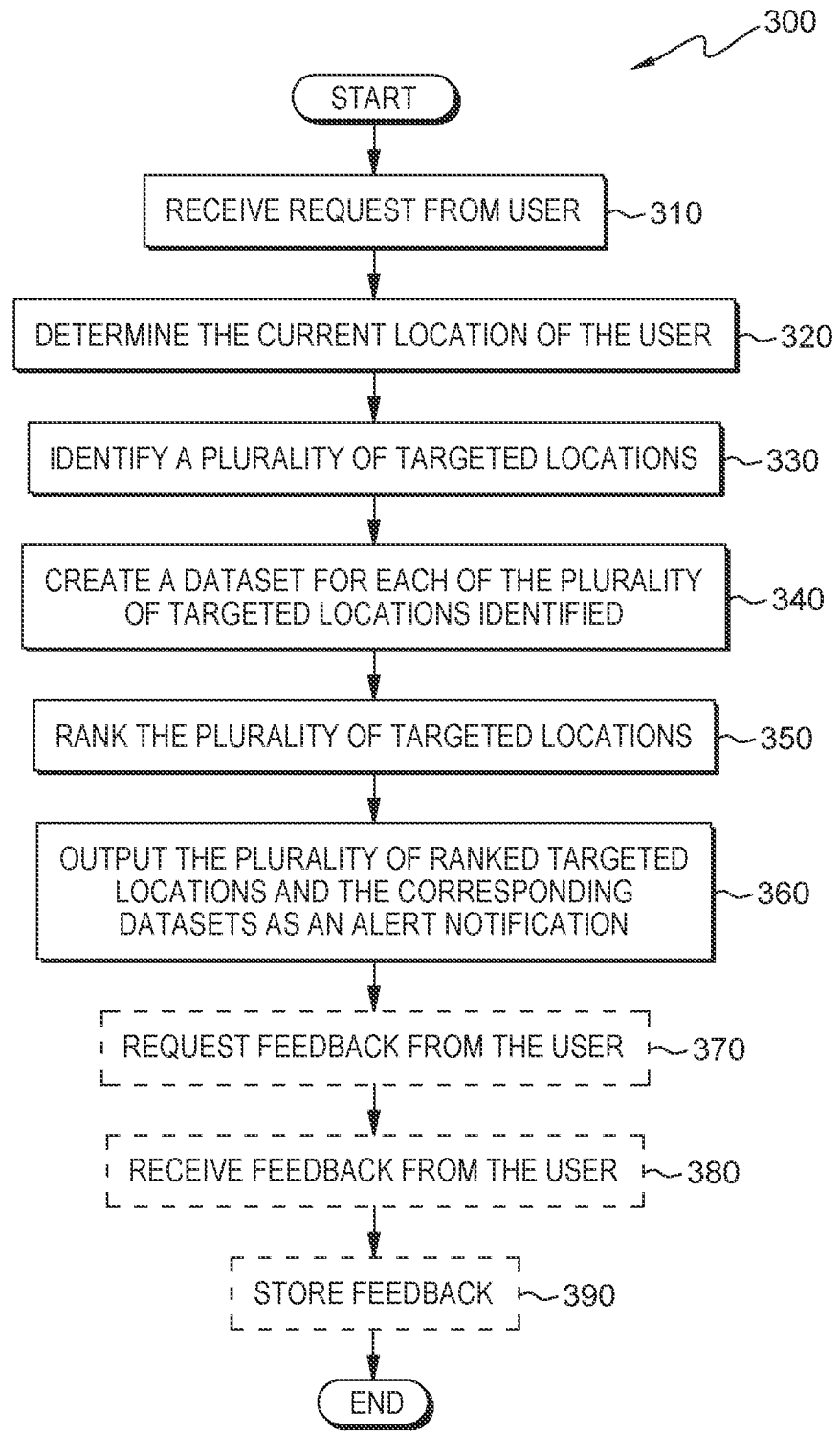
FIG. 3 is a flowchart depicting the operational steps for a pull component of the optimal experience program in a distributed data processing environment, such as the one depicted in FIG. 1, in accordance with an embodiment of the present invention.

FIG. 3 is a flowchart, generally designated 300, depicting the operational steps for a pull component of optimal experience program 122, in accordance with an embodiment of the present invention. In an embodiment, the pull component of optimal experience program 122 identifies a plurality of targeted location to visit and determines the optimal time to visit each of the plurality of targeted locations, the optimal weather condition to experience each of the plurality of targeted locations, and the optimal spot to capture at least one of a photo and a video of each of the plurality of targeted locations. It should be appreciated that the process depicted in FIG. 3 illustrates one possible iteration of the process flow, which can be repeated for each request received from a user.

In step 310, optimal experience program 122 receives a request from the user. In an embodiment, optimal experience program 122 receives a request from the user to conduct a search to identify a plurality of targeted locations to visit and to determine the optimal time to visit each of the plurality of targeted locations, the optimal weather condition to experience each of the plurality of targeted locations, and the optimal spot to capture at least one of a photo and a video of each of the plurality of targeted locations. In an embodiment, optimal experience program 122 receives a request from the user through user interface 132 of user computing device 130. For example, traveler A is visiting the Washington, D.C. area and is planning on sight-seeing. Traveler A sends a request to optimal experience program 122 to identify a plurality of targeted locations to visit and to determine the optimal time to visit each of the plurality of targeted locations, the optimal weather condition to experience each of the plurality of targeted locations, and the optimal spot to capture at least one of a photo and a video of each of the plurality of targeted locations through user interface 132 of user computing device 130.

In step 320, optimal experience program 122 determines the current location of the user. In an embodiment, optimal experience program 122 determines the current location of the user using the user's shared real-time location. In an embodiment, responsive to optimal experience program 122 receiving a request from the user to conduct a search, optimal experience program 122 determines the current location of the user.

In one or more embodiments, optimal experience program 122 determines the current location of the user using mobile positioning, a location-based service on user computing device 130, that employs information from cellular (i.e., cell tower locations), Wi-Fi® (i.e., crowd-sourced Wi-Fi® hotspot locations), and/or GPS networks. For example, optimal experience program 122 collects data sent from user computing device 130 to the cell tower closest to user computing device 130 in order to determine the current location of the user. For example, optimal experience program 122 collects data sent from user computing device 130 to databases of known Wi-Fi® hotspots in order to determine the current location of the user.

The examples of optimal experience program 122 determining the current location of the user are described herein with individual methods, but it should be noted that optimal experience program 122 may determine the current location of the user via one or more combinations of the above embodiments.

In step 330, optimal experience program 122 identifies a plurality of targeted locations. In an embodiment, responsive to optimal experience program 122 determining the current location of the user, optimal experience program 122 identifies a plurality of targeted locations. In an embodiment, optimal experience program 122 identifies a plurality of targeted locations for the user to visit by scraping population density data for a given geographical location from a network-based cell phone carrier (i.e., data on the number of users of a given cellular network which is composed of a cell or a geographical zone around a cell phone tower). In an embodiment, optimal experience program 122 determines how populated a targeted location is based on current population density data and how populated a targeted location will be based on future forecasted population density data. In an embodiment, a geographical location may be represented in terms including, but not limited to, latitude, longitude, and altitude.

For example, traveler A sends a request to optimal experience program 122 to determine what is the optimal targeted location to visit, when is the optimal time to visit the targeted location, and where is the optimal spot to capture at least one of a photo and a video of the targeted location. In response to this request, optimal experience program 122 determines the current location of traveler A is Washington, D.C. Optimal experience program 122 scrapes population density data for the Washington, D.C. area (i.e., 38.9072° N, 77.0369° W). In doing so, optimal experience program 122 identifies a plurality of targeted locations around the Washington, D.C. area, including the Lincoln Memorial (i.e., 38.8893° N, 77.0502° W), the Lincoln Memorial Reflecting Pool (i.e., 38.8893° N, 77.0447° W), the Washington Monument (i.e., 38.8895° N, 77.0353° W), and the Thomas Jefferson Memorial (i.e., 38.8814° N, 77.0365° W). Further, optimal experience program 122 determines how populated each of these targeted locations currently are and how populated these targeted locations will be and makes a recommendation to traveler on whether to visit a targeted location now or during a future visit.

In one or more embodiments, optimal experience program 122 identifies a plurality of targeted locations for the user to visit by scraping data from social media posts in which the plurality of targeted locations are the subject. For example, optimal experience program 122 scraped a photo traveler A captured of the Lincoln Memorial Reflecting Pool and uploaded to traveler A's social media account.

The examples of optimal experience program 122 identifying a plurality of targeted locations are described herein with individual methods, but it should be noted that optimal experience program 122 may identify a plurality of targeted locations via one or more combinations of the above embodiments.

In step 340, optimal experience program 122 creates a dataset for each of the targeted locations identified. The dataset created includes, but is not limited to, the calculated distance between the current location of the user and the targeted location, the anticipated popularity of the targeted location at a specific date and time, the current and forecasted weather at the targeted location, and a set of GPS coordinates and a heading for the optimal photo set up of the targeted location. Step 340 is described in further detail with respect to flowchart 500 in FIG. 5. In an embodiment, responsive to optimal experience program 122 identifying a plurality of targeted locations, optimal experience program 122 creates a dataset for each of the targeted locations identified.

In step 350, optimal experience program 122 ranks the plurality of targeted locations. In an embodiment, optimal experience program 122 ranks the plurality of targeted locations using a set of factors, which are weighted based on user preferences. The set of factors used to rank the targeted locations include, but are not limited to, user interest, distance from the current location of the user, route to travel to and from the targeted location, popularity of targeted location, corresponding crowd size, time of day, weather, local business advertising and/or incentives, ADA compliance of targeted location, tourism services, and/or facilities provided by the targeted location (e.g., restrooms, vending machines, water fountains). In an embodiment, responsive to optimal experience program 122 creating the dataset for each of the targeted locations identified, optimal experience program 122 ranks the plurality of targeted locations.

In step 360, optimal experience program 122 outputs the plurality of ranked targeted locations and the corresponding datasets as an alert notification. Alert notifications include, but are not limited to, system alert notifications, push notifications, and chat messages. In an embodiment, optimal experience program 122 outputs the alert notification through user interface 132 of user computing device 130. In an embodiment, responsive to optimal experience program 122 ranking the plurality of targeted locations, optimal experience program 122 outputs the plurality of ranked targeted locations and the corresponding datasets as an alert notification.

In step 370, optimal experience program 122 requests feedback from the user. In an embodiment, optimal experience program 122 requests feedback from the user through user interface 132 of user computing device 130. In an embodiment, optimal experience program 122 requests feedback regarding the output of the plurality of ranked targeted locations and the corresponding datasets to the user in step 360. In an embodiment, responsive to outputting the plurality of ranked targeted locations and the corresponding datasets to the user, optimal experience program 122 requests feedback from the user.

In step 380, optimal experience program 122 receives feedback from the user. In an embodiment, optimal experience program 122 receives feedback from the user through user interface 132 of user computing device 130. In an embodiment, responsive to optimal experience program 122 requesting feedback from the user, optimal experience program 122 receives the feedback from the user.

In step 390, optimal experience program 122 stores the feedback. In an embodiment, optimal experience program 122 stores the feedback received from the user. In an embodiment, optimal experience program 122 stores the feedback in a database, e.g., database 124. In an embodiment, optimal experience program 122 uses the feedback to improve optimal experience program 122 in identifying locations in step 330. In an embodiment, optimal experience program 122 improves optimal experience program 122 using a recommendation system. Recommendation systems include, but are not limited to, reinforcement learning, machine learning, collaborative filtering, matrix decomposition, clustering, and/or any deep learning approach. In an embodiment, responsive to optimal experience program 122 receiving feedback from the user, optimal experience program 122 stores the feedback.

In some embodiments, optimal experience program 122 may perform steps 370, 380, and 390 as optional steps. Through tracked user activity and user responses to requests sent in step 370, optimal experience program 122 utilizes reinforcement learning to improve with each iteration of optimal experience program 122 to better coincide with how the user would react to each individual alert notification.

Figure 4:
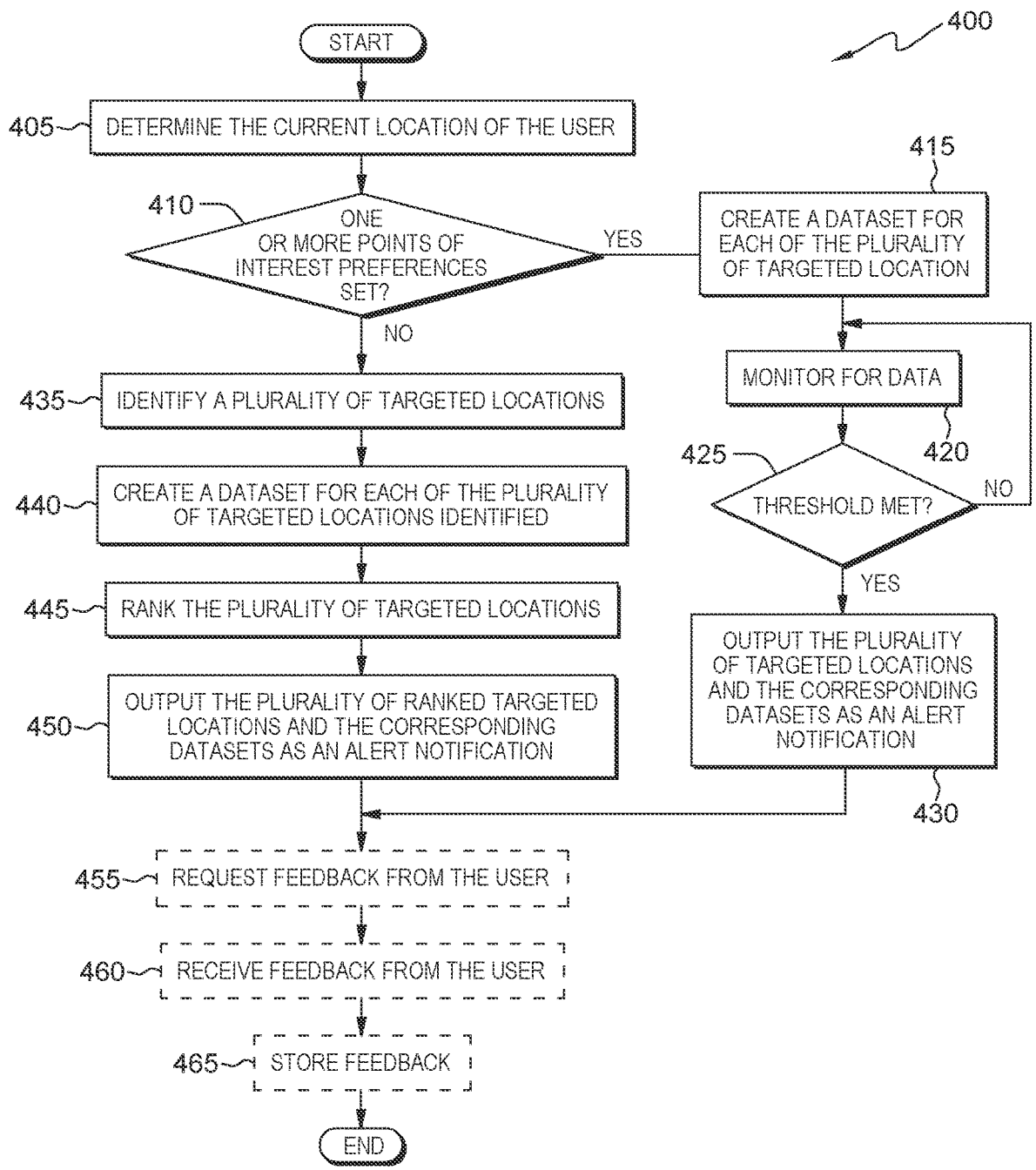
FIG. 4 is a flowchart depicting the operational steps for a push component of the optimal experience program in a distributed data processing environment, such as the one depicted in FIG. 1, in accordance with an embodiment of the present invention.

FIG. 4 is a flowchart, generally designated 400, depicting the operational steps for a push component of optimal experience program 122, in accordance with an embodiment of the present invention. In an embodiment, the push component of optimal experience program 122 identifies a plurality of targeted location to visit and determines the optimal time to visit each of the plurality of targeted locations, the optimal weather condition to experience each of the plurality of targeted locations, and the optimal spot to capture at least one of a photo and a video of each of the plurality of targeted locations. In an embodiment, optimal experience program 122 runs iteratively as the user travels to new locations and/or as the public, crowdsourced, cloud-based database is updated with new data. It should be appreciated that the process depicted in FIG. 4 illustrates one possible iteration of the process flow.

In step 405, optimal experience program 122 determines the current location of the user. In an embodiment, optimal experience program 122 determines the current location of the user using the user's shared real-time location.

In one or more embodiments, optimal experience program 122 determines the current location of the user using mobile positioning, a location-based service on user computing device 130, that employs information from cellular (i.e., cell tower locations), Wi-Fi® (i.e., crowd-sourced Wi-Fi® hotspot locations), and/or GPS networks. For example, optimal experience program 122 collects data sent from user computing device 130 to the cell tower closest to user computing device 130 in order to determine the current location of the user. For example, optimal experience program 122 collects data sent from user computing device 130 to databases of known Wi-Fi® hotspots in order to determine the current location of the user.

The examples of optimal experience program 122 determining the current location of the user are described herein with individual methods, but it should be noted that optimal experience program 122 may determine the current location of the user via one or more combinations of the above embodiments.

In decision 410, optimal experience program 122 determines whether the user input one or more points of interest preferences. In an embodiment, optimal experience program 122 determines whether the user input one or more points of interest preferences in step 230 of FIG. 2 by checking the user profile for the user. In an embodiment, optimal experience program 122 determines whether the user input one or more points of interest preferences including, but not limited to, information about the point(s) of interest the user would like to visit while in a particular area and information on how important it is that the user visit each point of interest. In an embodiment, responsive to optimal experience program 122 determining the user's location, optimal experience program 122 determines whether the user input points of interest preferences.

If optimal experience program 122 determines the user input one or more points of interest preferences (decision 410, YES branch), then optimal experience program 122 creates a dataset for each of the point(s) of interest (also referred to as "targeted location(s)) (step 415).

In step 415, optimal experience program 122 creates a dataset for a targeted location. The dataset created includes, but is not limited to, the calculated distance between the current location of the user and the targeted location, the anticipated popularity of the targeted location at a specific date or time, the current and forecasted weather at the targeted location, and a set of GPS coordinates and a heading for the optimal photo set up of the targeted location. Step 415 is described in further detail with respect to flowchart 500 in FIG. 5. In an embodiment, responsive to optimal experience program 122 determining the user input points of interest preferences, optimal experience program 122 creates a dataset.

In step 420, optimal experience program 122 monitors for data. In an embodiment, optimal experience program 122 monitors for data including, but not limited to, the distance between the current location of the user and the targeted location, the current and anticipated popularity of the targeted location, and/or the current and forecasted weather at the targeted location. In an embodiment, optimal experience program 122 stores any collected data in a database, e.g., database 124. In an embodiment, responsive to optimal experience program 122 creating a dataset, optimal experience program 122 monitors for data.

In decision 425, optimal experience program 122 determines whether a pre-set threshold has been met. In an embodiment, optimal experience program 122 determines whether a pre-set threshold for outputting the targeted location and the corresponding dataset to the user has been met. In an embodiment, optimal experience program 122 determines whether a pre-set threshold has been met by assessing the data collected in step 420. In some embodiments, the threshold for outputting the targeted location and the corresponding dataset to the user is pre-configured by the user through user interface 132 of user computing device 130. In an embodiment, responsive to optimal experience program 122 monitoring for data, optimal experience program 122 determines whether a pre-set threshold has been met.

In one or more embodiments, optimal experience program 122 pre-configures the threshold for outputting the targeted location and the corresponding dataset to the user to be triggered prior to a peak experience time. In an embodiment, optimal experience program 122 pre-configures the threshold for outputting the targeted location and the corresponding dataset to the user to be triggered prior to a peak experience time when the current conditions of the targeted location match the historically highest rated conditions (i.e., optimal weather condition, optimal time of day, etc.) of the targeted location and when the user is located within a set distance from the targeted location. For example, the weather at the Golden Gate Bridge is often extremely foggy, a sub-optimal weather condition. The threshold for optimal experience program 122 outputting an alert notification is pre-configured to be triggered when the current and/or the forecasted weather data for Golden Gate Bridge shows little to no fog, an optimal weather condition, and when the user is located in the San Francisco area of California.

In one or more embodiments, optimal experience program 122 pre-configures the threshold for outputting the targeted location and the corresponding dataset to the user to be triggered prior to a rare occurrence. For example, optimal viewing of the Northern Lights in Iceland occurs when there are more hours of darkness in a day and when there is more solar activity in the sky. The threshold for optimal experience program 122 outputting an alert notification is pre-configured to be triggered when the current and/or the forecasted weather data shows that these optimal conditions will occur in the near future.

If optimal experience program 122 determines the pre-set threshold has been met (decision 425, YES branch), then optimal experience program 122 outputs the targeted location and the corresponding dataset as an alert notification (step 430). If optimal experience program 122 determines the pre-set threshold has not been met (decision 425, NO branch), then optimal experience program 122 continues to monitor for data (step 420).

In step 430, optimal experience program 122 outputs the targeted location and the corresponding dataset as an alert notification. Alert notifications include, but are not limited to, system alert notifications, push notifications, and chat messages. In an embodiment, optimal experience program 122 outputs the alert notification to a user through user interface 132 of user computing device 130. In an embodiment, responsive to optimal experience program 122 determining a pre-set threshold has been met, optimal experience program 122 outputs the targeted location and the corresponding dataset as an alert notification.

Returning to decision 410, if optimal experience program 122 determines the user has not set one or more points of interest preferences (decision 410, NO branch), then optimal experience program 122 identifies a plurality of targeted locations for the user to visit (step 435).

In step 435, optimal experience program 122 identifies a plurality of targeted locations. In an embodiment, optimal experience program 122 identifies a plurality of targeted locations for the user to visit. In an embodiment, responsive to optimal experience program 122 determining whether the user input point of interest preferences, optimal experience program 122 identifies a plurality of targeted locations. In an embodiment, optimal experience program 122 identifies a plurality of targeted locations for the user to visit by scraping population density data for a given geographical location from a network-based cell phone carrier. In an embodiment, optimal experience program 122 determines how populated a targeted location is based on current population density data and how populated a targeted location will be based on future forecasted population density data. In an embodiment, a geographical location may be represented in terms including, but not limited to, latitude, longitude, and altitude.

For example, traveler A sends a request to optimal experience program 122 to determine what is the optimal targeted location to visit, when is the optimal time to visit the targeted location, and where is the optimal spot to capture at least one of a photo and a video of the targeted location. In response to this request, optimal experience program 122 determines the current location of traveler A is Washington, D.C. Optimal experience program 122 scrapes population density data for the Washington, D.C. area (i.e., 38.9072° N, 77.0369° W). In doing so, optimal experience program 122 identifies a plurality of targeted locations around the Washington, D.C. area, including the Lincoln Memorial (i.e., 38.8893° N, 77.0502° W), the Lincoln Memorial Reflecting Pool (i.e., 38.8893° N, 77.0447° W), the Washington Monument (i.e., 38.8895° N, 77.0353° W), and the Thomas Jefferson Memorial (i.e., 38.8814° N, 77.0365° W). Further, optimal experience program 122 determines how populated each of these targeted locations currently are and how populated these targeted locations will be and makes a recommendation to traveler on whether to visit a targeted location now or during a future visit.

In one or more embodiments, optimal experience program 122 identifies a plurality of targeted locations for the user to visit by scraping data from social media posts in which the plurality of targeted locations are the subject. For example, optimal experience program 122 scraped a photo traveler A captured of the Lincoln Memorial Reflecting Pool and uploaded to traveler A's social media account.

The examples of optimal experience program 122 identifying a plurality of targeted locations are described herein with individual methods, but it should be noted that optimal experience program 122 may identify a plurality of targeted locations via one or more combinations of the above embodiments.

In step 440, optimal experience program 122 creates a dataset for each of the targeted locations identified. The dataset created includes, but is not limited to, the calculated distance between the current location of the user and the targeted location, the anticipated popularity of the targeted location at a specific date or time, the current and forecasted weather at the targeted location, and a set of GPS coordinates and a heading for the optimal photo set up of the targeted location. Step 440 is described in further detail with respect to flowchart 500 in FIG. 5. In an embodiment, responsive to optimal experience program 122 identifying a plurality of targeted locations, optimal experience program 122 creates a dataset.

In step 445, optimal experience program 122 ranks the plurality of targeted locations. In an embodiment, optimal experience program 122 ranks the plurality of targeted locations using a set of factors, which are weighted based on user preferences. The set of factors used to rank the targeted locations include, but are not limited to, user interest, distance from the current location of the user, route to travel to and from the targeted location, popularity of targeted location, corresponding crowd size, time of day, weather, local business advertising and/or incentives, ADA compliance of targeted location, and tourism services and/or facilities provided by the targeted location (e.g., restrooms, vending machines, water fountains). In an embodiment, responsive to optimal experience program 122 creating a dataset for each of the targeted locations identified, optimal experience program 122 ranks the plurality of targeted locations.

In step 450, optimal experience program 122 outputs the plurality of ranked targeted locations and the corresponding datasets as an alert notification. Alert notifications include, but are not limited to, system alert notifications, push notifications, and chat messages. In an embodiment, optimal experience program 122 outputs the alert notification through user interface 132 of user computing device 130. In an embodiment, responsive to optimal experience program 122 determining a pre-set threshold has been met, optimal experience program 122 outputs the plurality of ranked targeted locations and the corresponding datasets as an alert notification.

In step 455, optimal experience program 122 requests feedback from the user. In an embodiment, optimal experience program 122 requests feedback from the user through user interface 132 of user computing device 130. In an embodiment, optimal experience program 122 requests feedback regarding the output of the plurality of ranked targeted locations and the corresponding datasets sent to the user in step 350. In an embodiment, responsive to optimal experience program 122 outputting the plurality of ranked targeted locations and the corresponding datasets to the user as an alert notification, optimal experience program 122 requests feedback from the user. In another embodiment, responsive to optimal experience program 122 outputting the targeted location and the corresponding dataset to the user as an alert notification, optimal experience program 122 requests feedback from the user.

In step 460, optimal experience program 122 receives feedback from the user. In an embodiment, optimal experience program 122 receives feedback from the user through user interface 132 of user computing device 130. In an embodiment, responsive to optimal experience program requesting feedback from the user, optimal experience program 122 receives the feedback from the user.

In step 465, optimal experience program 122 stores the feedback. In an embodiment, optimal experience program 122 stores the feedback received from the user. In an embodiment, optimal experience program 122 stores the feedback received in a database, e.g., database 124. In an embodiment, optimal experience program 122 uses the feedback to improve optimal experience program 122 in identifying locations in step 430. In an embodiment, optimal experience program 122 improves optimal experience program 122 using a recommendation system. Recommendation systems include, but are not limited to, reinforcement learning, machine learning, collaborative filtering, matrix decomposition, clustering, and/or any deep learning approach. In an embodiment, responsive to optimal experience program 122 receiving feedback from the user, optimal experience program 122 stores the feedback.

In some embodiments, optimal experience program 122 may perform steps 455, 460, and 465 as optional steps. Through tracked user activity and user responses to requests sent in step 455, optimal experience program 122 can improve with each iteration of optimal experience program 122 to better coincide with how the user would react to each individual alert notification.

Figure 5:
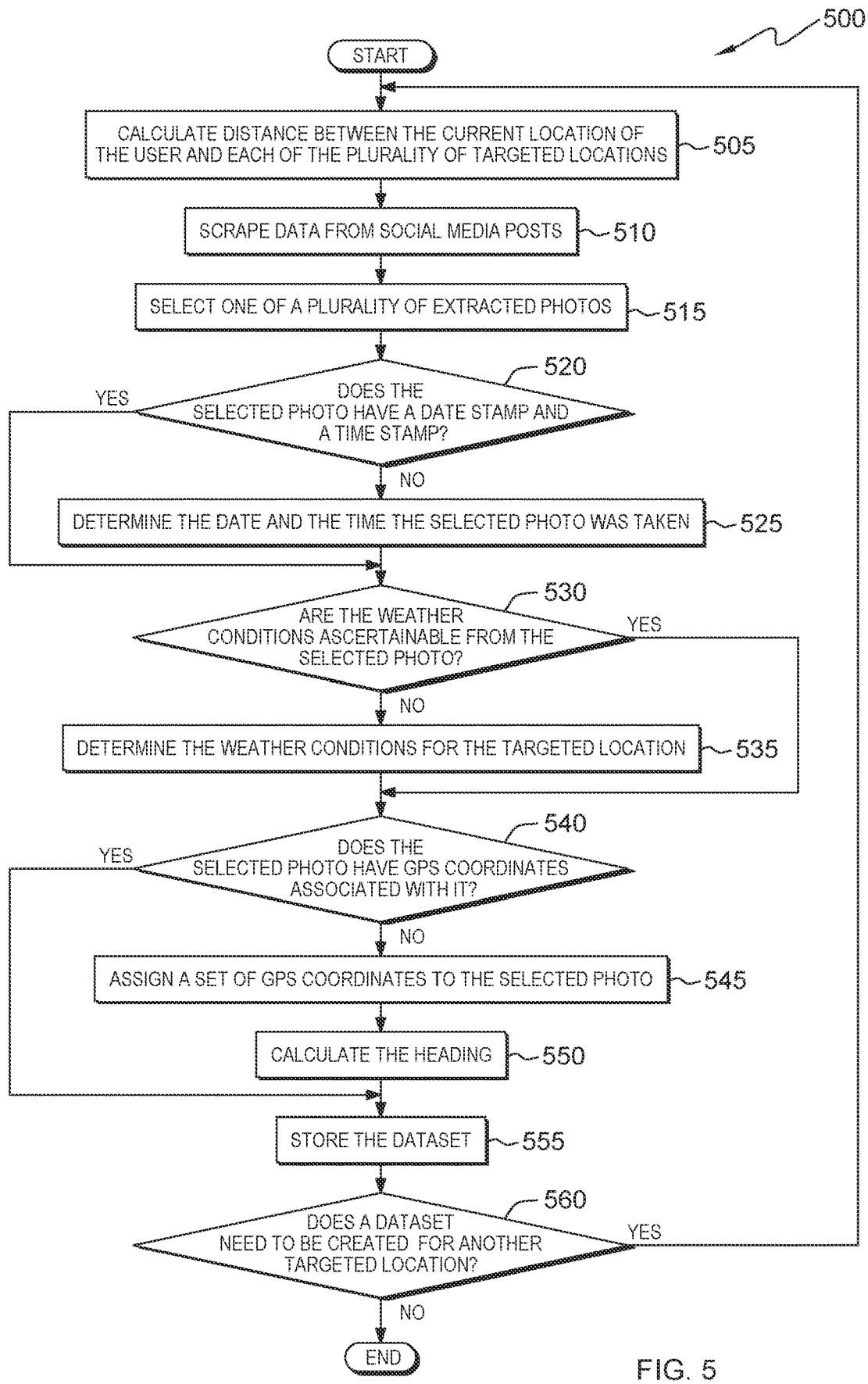
FIG. 5 is a flowchart depicting the operational steps for a dataset creation component of the optimal experience program in a distributed data processing environment, such as the one depicted in FIG. 1, in accordance with an embodiment of the present invention.

FIG. 5 is a flowchart, generally designated 500, depicting, in greater detail, the operational steps of dataset creation step 340 of the pull component of optimal experience program 122 and of dataset creation step 415 of the push component of optimal experience program 122 in distributed data processing environment 100, in accordance with an embodiment of the present invention. In the depicted embodiment, dataset creation step 340 and dataset creation step 415 operate to create a dataset for each identified targeted location that includes, but is not limited to, the calculated distance between the current location of the user and the targeted location, the anticipated popularity of the targeted location at a specific date and/or time of day, the expected weather pattern at a specific date and/or time of day, and the approximate geographical location from where the traveler can capture at least one of a photo and a video of the targeted location. It should be appreciated that the process depicted in FIG. 5 illustrates one possible iteration of the possible iteration of the process flow.

In step 505, optimal experience program 122 calculates the distance between the current location of the user and each of the plurality of targeted locations. In an embodiment, optimal experience program 122 calculates the distance between the current location of the user and each of the plurality of targeted locations by mapping one or more routes the user can travel by one or more modes of transportation, including, but not limited to, foot, bicycle, motorcycle, car, taxi, ride share, bus, train, ferry, and airplane. In an embodiment, optimal experience program 122 calculates the distance between the current location of the user and each of the plurality of targeted locations by mapping one or more routes the user can travel, including, but not limited to, the route with the shortest travel time, the route with the shortest distance traveled, the route avoiding toll roads, the route avoiding freeways, the route avoiding ferries, and the route avoiding difficult intersections. In an embodiment, optimal experience program 122 calculates the distance between the current location of the user and each of the plurality of targeted locations in units of length including, but not limited to, kilometers, miles, nautical miles, and the initial compass heading angle between the origin and the destination.

In step 510, optimal experience program 122 scrapes data from social media posts associated with the targeted location. In an embodiment, optimal experience program 122 scrapes data from social media posts in which the targeted location is the subject. In an embodiment, optimal experience program 122 scrapes data from social media posts with high engagement. In an embodiment, optimal experience program 122 scrapes data from social media posts on social media platforms, including, but not limited to, social networking sites, micro blogging sites, photo sharing sites, and video sharing sites. In an embodiment, optimal experience program 122 scrapes data from social media posts using a scraping tool that is capable of extracting data. Extracted data includes, but is not limited to, images, videos, and text. In an embodiment, responsive to optimal experience program 122 calculating the distance between the current location of the user and one of the plurality of targeted locations, optimal experience program 122 scrapes data from social media posts associated with the targeted locations.

In step 515, optimal experience program 122 selects one of a plurality of extracted photos. In an embodiment, optimal experience program 122 selects one of a plurality of extracted photos that was captured at the optimal time of day in the optimal weather conditions and from the optimal distance and angle to capture the optimal photo of the targeted location (i.e., the optimal spot to capture at least one of a photo and a video of each of the plurality of targeted locations). In an embodiment, optimal experience program 122 selects one of a plurality of extracted photos from which dataset points of the optimal spot to capture at least one of a photo and a video of each of the plurality of targeted locations can be obtained. In an embodiment, responsive to optimal experience program scraping data from social media posts, optimal experience program 122 selects one of a plurality of extracted photos.

In decision 520, optimal experience program 122 determines whether the photo selected in decision 520 has a date stamp and a time stamp. For example, traveler B captured a photo of the Lincoln Memorial Reflecting Pool at 6:30 P.M. on Jun. 30, 2020, uploaded the photo to traveler B's social media account, and added a location tag as being at the Lincoln Memorial Reflecting Pool. Responding to traveler A's request, optimal experience program 122 scrapes traveler B's photo from traveler B's social media account. Optimal experience program 122 determines the photo traveler B captured is date stamped Jun. 30, 2020 and time stamped 6:30 P.M.

If optimal experience program 122 determines the photo has a date stamp and a time stamp (decision 520, YES branch), then optimal experience program 122 proceeds to decision 530, during which it is decided whether the weather conditions are ascertainable from the selected photo. If optimal experience program 122 determines the photo does not have a date stamp and a time stamp (decision 520, NO branch), then optimal experience program 122 proceeds to step 525 during which optimal experience program 122 determines the date and the time the photo was selected.

In step 525, optimal experience program 122 determines the date and the time the selected photo was taken. In an embodiment, optimal experience program 122 determines the date and the time the selected photo was taken from a date stamp and a time stamp on the photo. For example, traveler B captured a photo of the Lincoln Memorial Reflecting Pool at 6:30 P.M. on Jun. 30, 2020, uploaded the photo to traveler B's social media account, and added a location tag as being at the Lincoln Memorial Reflecting Pool. While responding to traveler A's request, optimal experience program 122 scrapes traveler B's photo from traveler B's social media account and determines the date and the time traveler B's photo was taken from a date stamp and a time stamp on the photo.

In one or more embodiments, optimal experience program 122 determines the time the selected photo was taken using the lunar cycle when the date the photo was taken is known. For example, traveler B captured a photo of the Lincoln Memorial Reflecting Pool, uploaded the photo to traveler B's social media account, and tagged the Lincoln Memorial Reflecting Pool. The photo traveler B captured is date stamped Jun. 30, 2020 but is not time stamped. Responding to traveler A's request, optimal experience program 122 scrapes traveler B's photo from traveler B's social media account. Using the date stamped on the photo scraped from traveler A's social media account, optimal experience program 122 determines that, on this day, the moon was in a Waxing Gibbous phase and nearly 74% of the moon was illuminated. It is known that in this phase, the moon rose in the east at 3:56 P.M., was at meridian at 9:27 P.M., and set in the eastern sky at 2:17 A.M. Using this information, optimal experience program 122 determines traveler B's photo was captured on Jun. 30, 2020 around 6:30 P.M.

In one or more embodiments, optimal experience program 122 determines the time the selected photo was taken using the solar cycle (i.e., the known path of travel of the sun) when the date the photo was taken is known. For example, traveler B captured a photo of the Lincoln Memorial Reflecting Pool, uploaded the photo to traveler B's social media account, and tagged the Lincoln Memorial Reflecting Pool. The photo traveler B captured is date stamped Jan. 20, 2021 but is not time stamped. Responding to traveler A's request, optimal experience program 122 scrapes traveler B's photo from traveler B's social media account. Using the date stamped on the photo scraped from traveler A's social media account, optimal experience program 122 determines that, on this day, the sun was close to or at its culmination (i.e., its highest point) in Washington, D.C. on Jan. 20, 2021 at 12:19 P.M.

The examples of optimal experience program 122 determining the date and the time the selected photo was taken are described herein with individual methods, but it should be noted that optimal experience program 122 may determine the date and the time the selected photo was taken via one or more combinations of the above embodiments.

In decision 530, optimal experience program 122 determines whether the weather conditions are ascertainable from the selected photo. If optimal experience program 122 determines the weather conditions are ascertainable from the selected photo (decision 530, YES branch), then optimal experience program 122 proceeds to decision 540, during which it is determined whether the selected photo has GPS coordinates associated with it. If optimal experience program 122 determines the weather conditions are not ascertainable from the selected photo (decision 530, NO branch), then optimal experience program 122 proceeds to step 535, during which optimal experience program 122 determines the current and forecasted weather data of the targeted location.

In step 535, optimal experience program 122 determines the weather conditions for the targeted location. Weather conditions includes, but are not limited to, current, forecasted, and seasonal weather conditions. In an embodiment, optimal experience program 122 determines current and forecasted weather conditions for the targeted location from known weather data sources. Weather conditions include, but are not limited to, real-time observational data and remotely sensed imagery data of air temperature, atmospheric (barometric) pressure, humidity, precipitation, solar radiation, and wind. Weather data sources include, but are not limited to, the National Weather Service (NWS), the Meteorological Simulation Data Ingest System (MADIS), and the Parameter-Elevation Regressions on Independent Slopes Model (PRISM).

In an embodiment, optimal experience program 122 determines seasonal weather conditions for the targeted location from photos scraped from social media posts in which the targeted location is the subject. In an embodiment, optimal experience program 122 scrapes photos from social media posts in which the targeted location is the subject. In an embodiment, optimal experience program 122 categorizes the scraped photos that have date stamps into weather conditions (e.g., sunny, cloudy, windy, snowy, and rainy). In an embodiment, optimal experience program 122 stores the scraped and categorized photos in a database, e.g., database 124.

In decision 540, optimal experience program 122 determines whether the selected photo has GPS coordinates associated with it. If optimal experience program 122 determines the selected photo has GPS coordinates associated with it (decision 540 YES branch), then optimal experience program 122 stores the dataset in a database, e.g., database 124 (step 555). If optimal experience program 122 determines the selected photo does not have GPS coordinates associated with it (decision 540, NO branch), then optimal experience program 122 proceeds to step 545, during which optimal experience program 122 assigns a set of GPS coordinates to the selected photo.

In step 545, optimal experience program 122 assigns a set of GPS coordinates to the selected photo. In an embodiment, optimal experience program 122 assigns the set of GPS coordinates that were captured when the selected photo was taken and stored as data in EXIF format by the user's phone and/or camera. For example, traveler B captured a photo of the Lincoln Memorial Reflecting Pool while standing on the steps of the Lincoln Memorial. Along with the photo, traveler B's phone captured the date and time of when the photo was taken and the GPS coordinates of where traveler B was located when taking the photo. Traveler B's phone stored this data in EXIF format. Accordingly, optimal experience program 122 assigned the GPS coordinates of traveler B, 38.8893° N, 77.0502° W, to traveler B's photo.

In one or more embodiments, optimal experience program 122 assigns a set of GPS coordinates to the selected photo using geo-spatial information extracted from the scraped photo. The geo-spatial information is based on celestial information, including, but not limited to, the elevation of the sun and time information.

The examples of optimal experience program 122 assigning a set of GPS coordinates to the selected photo are described herein with individual methods, but it should be noted that optimal experience program 122 may assign a set of GPS coordinates to the selected photo via one or more combinations of the above embodiments.

In step 550, optimal experience program 122 calculates the heading of the approximate geographical location of the selected photo. In an embodiment, optimal experience program 122 calculates the heading of the approximate geographical location of the selected photo using the Doppler effect when comparing data received from a GNSS and/or GPS with the movement of an object receiving the data.

In step 555, optimal experience program 122 stores the dataset. In an embodiment, optimal experience program 122 stores the dataset in a database, e.g., database 124. In an embodiment, responsive to optimal experience program 122 creating the dataset, optimal experience program 122 uses the dataset to create a list of ranked targeted locations in FIG. 3 step 340 and in FIG. 4 step 415.

In decision 560, optimal experience program 122 determines whether a dataset needs to be created for another targeted location. If optimal experience program 122 determines a dataset needs to be created for another targeted location (decision 560, YES branch), then optimal experience program 122 proceeds to step 505. If optimal experience program 122 determines a dataset does not need to be created for another targeted location (decision 560, NO branch), then optimal experience program 122 ends.

Figure 6:
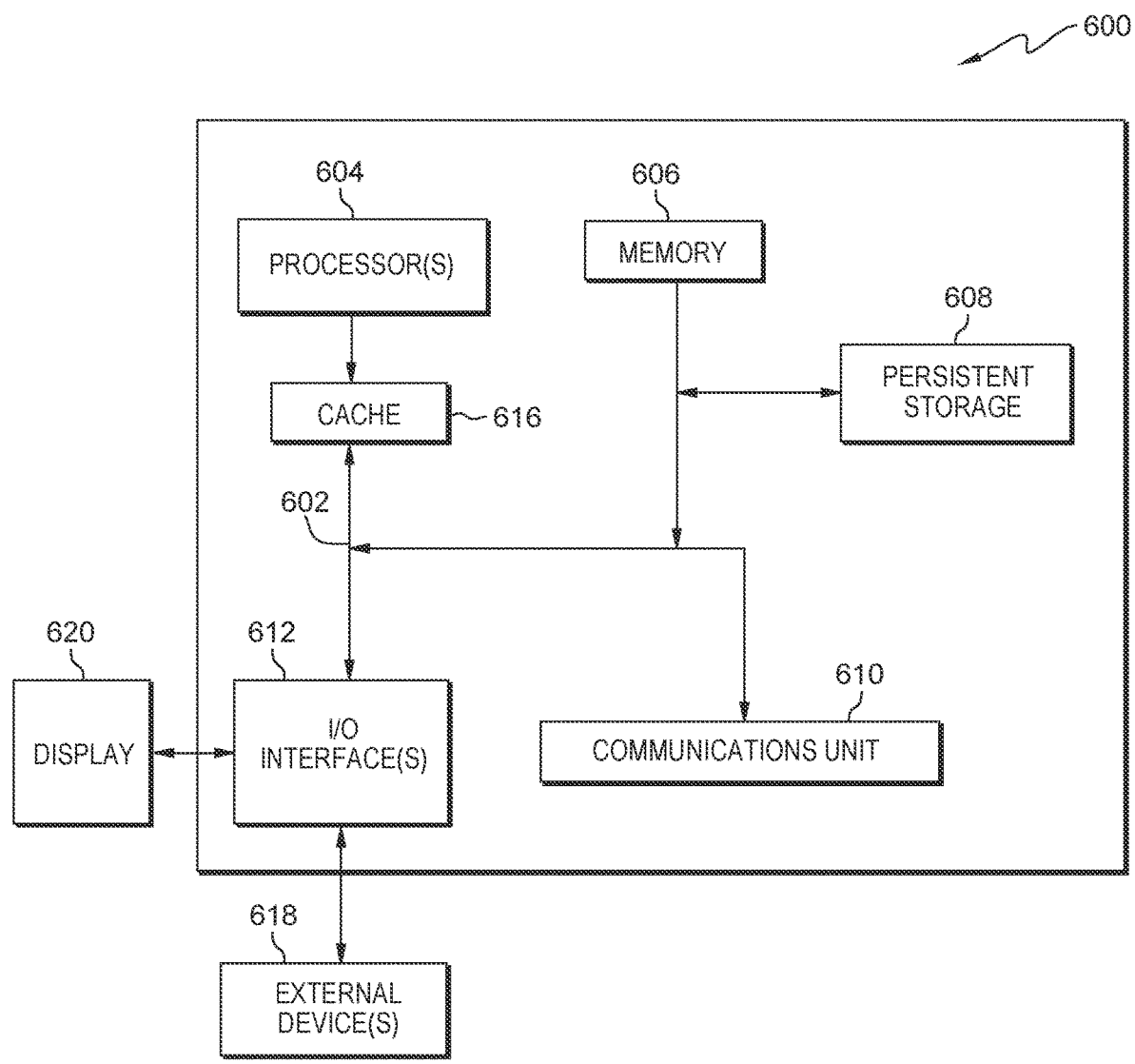
FIG. 6 is a block diagram of the components of a computing device of the distributed data processing environment of FIG. 1, in accordance with an embodiment of the present invention.

FIG. 6 is a block diagram of the components of computing device 600, suitable for server 120 and/or user computing device 130 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs may be downloaded to persistent storage 608 through communications unit 610.

I/O interface(s) 612 allows for input and output of data with other devices that may be connected to server 120 and/or user computing device 130. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more processors, a geographic location of a user using a shared real-time location of the user;
   identifying, by the one or more processors, a plurality of targeted locations within a pre-defined distance of the geographic location of the user;
   determining, by the one or more processors, the optimal time of day to visit each of the plurality of targeted locations, wherein determining the optimal time of day to visit each of the plurality of targeted locations further comprises:
      scraping, by the one or more processors, data from one or more social media posts on a social media platform in which at least one of the plurality of targeted locations is a subject of the one or more social media posts;
      selecting, by the one or more processors, a first photo of a targeted location of the plurality of targeted location from the data scraped from the one or more social media posts;
      determining, by the one or more processors, whether the first photo has a date stamp and a time stamp; and
      responsive to determining the first photo does not have the date stamp and the time stamp, determining, by the one or more processors, a date and a time the first photo was taken;
   determining, by the one or more processors, the optimal weather condition to experience each of the plurality of targeted locations from the data scraped from the one or more social media posts;
   determining, by the one or more processors, the optimal spot to capture a second photo of each of the plurality of targeted locations, wherein the optimal spot is designated by a set of Global Positioning System (GPS) coordinates and a heading, and wherein the optimal spot is located at an optimal distance and an optimal angle from which to capture the second photo at each of the plurality of targeted locations;
   assigning, by the one or more processors, a ranking to each of the plurality of targeted locations based on a set of factors in a user profile of the user; and
   outputting, by the one or more processors, a recommendation with at least one of the plurality of targeted locations as an alert notification.

2. The computer-implemented method of claim 1, further comprising:
   subsequent to outputting the recommendation with at least one of the plurality of targeted locations as the alert notification, requesting, by the one or more processors, feedback from the user;
   receiving, by the one or more processors, feedback from the user based on the recommendation with at least one of the plurality of targeted locations;
   adjusting, by the one or more processors, future recommendations based on the feedback on the recommendation; and
   storing, by the one or more processors, the feedback from the user.

3. The computer-implemented method of claim 1, wherein the first photo of the targeted location of the one or more targeted locations from the data scraped from the one or more social media posts was at least one of (1) captured at an optimal time of day to visit the targeted location (2) in an optimal weather condition to experience the targeted location and (3) from an optimal spot to capture a second photo of the targeted location.

4. The computer-implemented method of claim 1, wherein determining the date and the time the first photo was taken further comprises:
   using, by the one or more processors, a solar cycle involving a known path of travel of a sun; or
   using, by the one or more processors, a lunar cycle.

5. The computer-implemented method of claim 1, wherein determining the optimal weather condition to experience each of the plurality of targeted locations from the data scraped from the one or more social media posts further comprises:
   determining, by the one or more processors, whether a weather condition is ascertainable from the first photo; and
   responsive to determining the weather condition is not ascertainable from the first photo, determining, by the one or more processors, what the weather condition is at the targeted location.

6. The computer-implemented method of claim 1, wherein determining the optimal spot to capture the second photo of each of the plurality of targeted locations, wherein the optimal spot is designated by the set of GPS coordinates and the heading, and wherein the optimal spot is located at the optimal distance and the optimal angle from which to capture the second photo at each of the plurality of targeted locations, further comprises:
   determining, by the one or more processors, whether the first photo has the set of GPS coordinates associated with the first photo;
   responsive to determining the first photo does not have the set of GPS coordinates associated, assigning, by the one or more processors, the set of GPS coordinates to the first photo; and
   calculating, by the one or more processors, the heading.

7. The computer-implemented method of claim 6, wherein assigning the set of GPS coordinates to the first photo further comprises:
   using, by the one or more processors, the set of GPS coordinates captured when the first photo was taken and stored as data in Exchangeable Image File format by at least one of a phone of the user or a camera of the user; and
   using, by the one or more processors, geo-spatial information extracted from the first photo from the data scraped from the one or more social media posts.

8. The computer-implemented method of claim 6, wherein calculating the heading further comprises:
using, by the one or more processors, a doppler effect when comparing data received from a Global Navigation Satellite System (GNSS) or a GPS with the movement of an object receiving data.

9. The computer-implemented method of claim 1, wherein the set of factors comprises:
a user interest, the pre-defined distance of the geographic location of the user, a route to travel to and from the plurality of targeted locations, popularity of the plurality of targeted locations, a limited crowd size, a time of day, a weather condition, an advertisement from a local business, an incentive offered by the local business, a targeted location that is compliant with an Americans with Disabilities Act, a tourism service, and a targeted location that provides facilities including a restroom, a vending machine, or a water fountain.

10. The computer-implemented method of claim 1, further comprising:
identifying, by the one or more processors, that the user input at least one of the plurality of targeted locations into the user profile of the user;
monitoring, by the one or more processors, for data;
determining, by the one or more processors, whether a pre-defined threshold is met; and
responsive to determining the pre-defined threshold is met, outputting, by the one or more processors, the recommendation with the one or more targeted locations as the alert notification.

11. The computer-implemented method of claim 10, wherein the pre-defined threshold is at least one of a peak experience time when a current condition of the one or more targeted locations match historically highest rated conditions of the one or more targeted locations and a rare occurrence.

12. The computer-implemented method of claim 11, wherein the historically highest rated conditions are the optimal time to visit each of the plurality of targeted locations and the optimal weather condition to experience each of the plurality of targeted locations.

13. The computer-implemented method of claim 1, wherein the recommendation comprises:
the optimal time to visit each of the plurality of targeted locations, the optimal weather condition to experience each of the plurality of targeted locations, and the optimal spot to capture the second photo of each of the plurality of targeted locations.

14. A computer program product comprising:
one or more computer readable storage media and program instructions stored on the one or more computer readable storage media, the program instructions comprising:
program instructions to determine a geographic location of a user using a shared real-time location of the user;
program instructions to identify a plurality of targeted locations within a pre-defined distance of the geographic location of the user;
program instructions to determine the optimal time of day to visit each of the plurality of targeted locations, wherein determining the optimal time of day to visit each of the plurality of targeted locations further comprises:
program instructions to scrape data from one or more social media posts on a social media platform in which at least one of the plurality of targeted locations is a subject of the one or more social media posts;
program instructions to select a first photo of a targeted location of the plurality of targeted location from the data scraped from the one or more social media posts;
program instructions to determine whether the first photo has a date stamp and a time stamp; and
responsive to determining the first photo does not have the date stamp and the time stamp, program instructions to determine a date and a time the first photo was taken;
program instructions to determine the optimal weather condition to experience each of the plurality of targeted locations from the data scraped from the one or more social media posts;
program instructions to determine the optimal spot to capture a second photo of each of the plurality of targeted locations, wherein the optimal spot is designated by a set of Global Positioning System (GPS) coordinates and a heading, and wherein the optimal spot is located at an optimal distance and an optimal angle from which to capture the second photo at each of the plurality of targeted locations;
program instructions to assign a ranking to each of the plurality of targeted locations based on a set of factors in a user profile of the user; and
program instructions to output a recommendation with at least one of the plurality of targeted locations as an alert notification.

15. The computer program product of claim 14, further comprising:
subsequent to outputting the recommendation with at least one of the plurality of targeted locations as the alert notification, program instructions to request feedback from the user;
program instructions to receive feedback from the user based on the recommendation with the at least one of the plurality of targeted locations;
program instructions to adjust future recommendations based on the received feedback on the recommendation; and
program instructions to store the feedback from the user.

16. The computer program product of claim 14, further comprising:
program instructions to identify that the user input at least one of the plurality of targeted locations into the user profile of the user;
program instructions to monitor for data,
program instructions to determine whether a pre-defined threshold is met; and
responsive to determining the pre-defined threshold is met, program instruction to output the recommendation with the one or more targeted locations the alert notification.

17. A computer system comprising:
one or more computer processors;
one or more computer readable storage media;
program instructions collectively stored on the one or more computer readable storage media for execution by at least one of the one or more computer processors, the stored program instructions comprising:
program instructions to determine a geographic location of a user using a shared real-time location of the user;

program instructions to identify a plurality of targeted locations within a pre-defined distance of the geographic location of the user;
program instructions to determine the optimal time of day to visit each of the plurality of targeted locations, wherein determining the optimal time of day to visit each of the plurality of targeted locations further comprises:
    program instructions to scrape data from one or more social media posts on a social media platform in which at least one of the plurality of targeted locations is a subject of the one or more social media posts;
    program instructions to select a first photo of a targeted location of the plurality of targeted location from the data scraped from the one or more social media posts;
    program instructions to determine whether the first photo has a date stamp and a time stamp; and
    responsive to determining the first photo does not have the date stamp and the time stamp, program instructions to determine a date and a time the first photo was taken;
program instructions to determine the optimal weather condition to experience each of the plurality of targeted locations from the data scraped from the one or more social media posts;
program instructions to determine the optimal spot to capture a second photo of each of the plurality of targeted locations, wherein the optimal spot is designated by a set of Global Positioning System (GPS) coordinates and a heading, and wherein the optimal spot is located at an optimal distance and an optimal angle from which to capture the second photo at each of the plurality of targeted locations;
program instructions to assign a ranking to each of the plurality of targeted locations based on a set of factors in a user profile of the user; and
program instructions to output a recommendation with at least one of the plurality of targeted locations as an alert notification.

18. The computer system of claim 17, further comprising:
subsequent to outputting the recommendation with at least one of the plurality of targeted locations as the alert notification, program instructions to request feedback from the user;
program instructions to receive feedback from the user based on the recommendation with the at least one of the plurality of targeted locations;
program instructions to adjust future recommendations based on the received feedback on the recommendation; and
program instructions to store the feedback from the user.

19. The computer system of claim 17, further comprising:
program instructions to identify that the user input at least one of the plurality of targeted locations into the user profile of the user;
program instructions to monitor for data,
program instructions to determine whether a pre-defined threshold is met; and
responsive to determining the pre-defined threshold is met, program instruction to output the recommendation with the one or more targeted locations as the alert notification.

* * * * *